United States Patent [19]

Betts

[11] 4,092,189

[45] May 30, 1978

[54] HIGH RATE PROPELLANT

[75] Inventor: Robert E. Betts, Huntsville, Ala.

[73] Assignee: The United States of America as represented by the Secretary of the Army, Washington, D.C.

[21] Appl. No.: 821,019

[22] Filed: Aug. 1, 1977

[51] Int. Cl.² ............................................. C06B 45/10
[52] U.S. Cl. ................................. 149/19.2; 149/19.4; 149/19.9; 149/19.92; 149/20; 149/21; 149/22; 149/76; 149/110; 264/3 C
[58] Field of Search ............... 149/76, 19.4, 20, 19.91, 149/19.2, 19.9, 19.92, 21, 22, 110; 264/3 R, 3 C

[56] References Cited

U.S. PATENT DOCUMENTS 3,837,938  9/1974  Havey et al. ....................... 149/20 X

*Primary Examiner*—Stephen J. Lechert, Jr.
*Attorney, Agent, or Firm*—Nathan Edelberg; Robert P. Gibson; Jack W. Voigt

[57] ABSTRACT

A method of preparing high burning rate solid propellant grains that have good mechanical properties and the high burning rate solid propellant grains prepared from a multimodal blend of at least one ultra-high burning rate propellant that has been cured and ground to a predetermined particle size of from about 100 microns (0.1 millimeter) to about 5 millimeters and at least one uncured propellant composition that has high tensile strength and compatibility with the ultra-high burning rate propellant and that serves as a binder for the solid propellant grain when cured. The solid propellant grain which has good mechanical and physical properties and a high burning rate burns with a flame that moves through the grain as a plane wave. Even though the individual components have different burning rates, it is the rate of the plane wave through the grain that is controlled by the averaging of the rate of burning through each of the particles of the multimodal blend and the binder propellant.

The method includes preparing a cured ultra-high burning rate propellant that is subsequently ground and screened to a predetermined particle size. The ground and screened propellant is then combined with an uncured propellant that is subsequently cured to yield a high burning rate solid propellant grain with good mechanical properties.

2 Claims, 2 Drawing Figures

HIGH RATE PROPELLANT

DEDICATORY CLAUSE

The invention described herein may be manufactured, used, and licensed by or for the Government for governmental purposes without the payment to me of any royalties thereon.

BACKGROUND OF THE INVENTION

The method of this invention relates to the preparation of a solid propellant grain that has high burning rate and good mechanical properties.

U.S. Pat. No. 1,455,309 issued to Archibald Jackson Strane on May 15, 1923 employs a mixture of black powder and nitrocellulose smokeless powder. U.S. Pat. No. 1,455,309 is directed to a loose bed of mixed grains, one of which is ground colloided nitrocellulose powder, the other grain being black blasting powder. These grains are only a mechanical mixture which has no physical properties such as tensile strength. The burning rate throughout the bed is not controlled by chemical means, but only by flame propagation through the bed at local pressure conditions.

The present invention pertains to a solid structure of a heterogenous blend with the components thereof being held in place without movement. During burning of the heterogenous blend the flame front moves through the structure as a plane wave. This invention relates to the method of preparation of a multimodal blend which is cured to yield a high burning rate solid propellant grain that has good mechanical properties.

A problem associated with very high rate propellants relates to the poor physical and mechanical properties which are not conductive for use in rocket motors, particularly in case bonded motors. These propellants (such as ultrafine ammonium perchlorate-carborane propellants) have low tensile strength which allows the propellant to tear and separate or they have high strength propellants (such as is characteristic of the polysulfide or other epoxide type propellants) with brittle properties which results in propellant cracking and debonding, particularly during temperature changes to low temperatures.

Advantageous would be a method which incorporates high burning rate with good physical properties in a finished propellant grain.

Therefore an object of this invention is to provide a method of achieving high burning rate solid propellant grains that also have good physical properties.

Another object of this invention is to provide a high burning rate solid propellant grain that has good physical properties.

A further object of this invention is to provide a high burning rate solid propellant grain having a controlled burning rate that is controlled by propagation of the plane wave through the grain.

SUMMARY OF THE INVENTION

A multimodal blend of at least one ultra-high burning rate propellant that has been cured, and ground to a predetermined particle size of from about 100 microns (0.1 mm) to about 5 mm, and at least one uncured propellant composition that has high strength and compatibility with the ultra-high burning rate propellant and that serves as the binder are cured to yield a high burning rate solid propellant grain with good mechanical properties.

A representative suitable propellant for the ultra-high burning rate propellant is comprised of aluminum metal fuel, ultrafine ammonium perchlorate oxidizer, a hydroxy-terminated polybutadiene polymer binder, a carborane burning rate modifier, a plasticizer, a crosslinking agent, and a diisocyanate curing agent. This propellant is formulated to yield a burning rate in excess of 15 inches per second at 2000 psi chamber pressure. However, the low tensile strength of this propellant makes it unsuitable for performance in case bonded propellant grain use.

The ultra-high burning rate propellant composition described above is processed and cured in thin sheets or other geometries which facilitates the grinding after curing. Another propellant is processed using the same formulation ingredients but with ingredients in different percentages to achieve a high tensile strength and a lower burning rate (e.g., of about 10 inches per second at 2000 psi chamber pressure). The high tensile strength and lower burning rate results from a high percentage of binder and a lower percentage of UFAP and/or aluminum metal fuel.

The ultra-high burning rate propellant granules are added to the second propellant which is uncured and while it is being processed. Then, the resulting mixture is thoroughly blended to yield a multimodal blend of two independent propellants which is cured to yield a propellant grain. This propellant grain when burned will behave as a single propellant whose burning rate relates to the rate of the plane wave movement through the propellant grain. The flame front thus moves through the grain as a plane wave. It is the rate of this plane wave which is controlled by the progressive burning influenced by the arrangement of the particles of the multimodal blend.

DESCRIPTION OF THE PREFERRED EMBODIMENT

The method of this invention comprises preparing an ultra-high burning rate propellant that is cured in thin sheets or other geometries which facilitates the grinding into granules. The ground propellant is screened to a predetermined particle size of from about 100 microns (0.1 mm) to about 5 mm. Another propellant is processed using the same formulation ingredients but in different percentages of ingredients to achieve a high tensile strength and lower burning rate results from an increased percentage of binder and a lower precentage of UFAP and/or aluminum metal fuel. The advantage of using the same ingredients for the ultra-high burning granules as for the binder propellant is to ensure compatibility in the multimodal blend during mixing, curing and after curing.

The ultra-high burning rate propellant granules are added to an uncured propellant binder or a second propellant composition which functions as a binder, thoroughly blended, and subsequently cured to yield a multimodal blended propellant grain. This propellant grain will burn as a single propellant. The burning rate relates to the rate of the flame front which progressively travels through the propellant grain as a plane wave.

Figure 1:
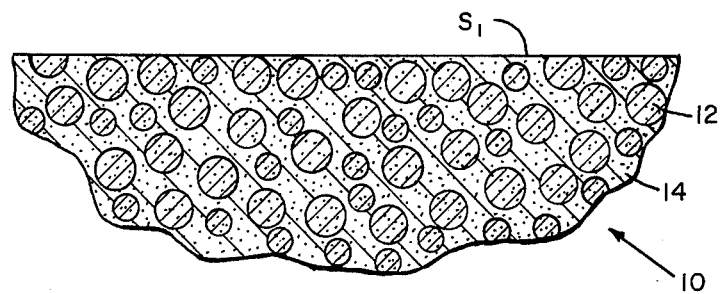
FIG. 1 of the drawing illustrates a multimodal blend of ultra-high burning rate propellant granules in a binder or a lower burning rate propellant which serves as the binder.

In further reference to the Figures of the drawing, FIG. 1 depicts a multimodal propellant grain 10 which contains ultra-high rate propellant granules 12 and a binder or lower burning rate (binder propellant) 14 in which the propellant 12 granules are uniformly dispersed and bound. The burning surface #1 is illustrated by the designation $S_1$.

Figure 2:
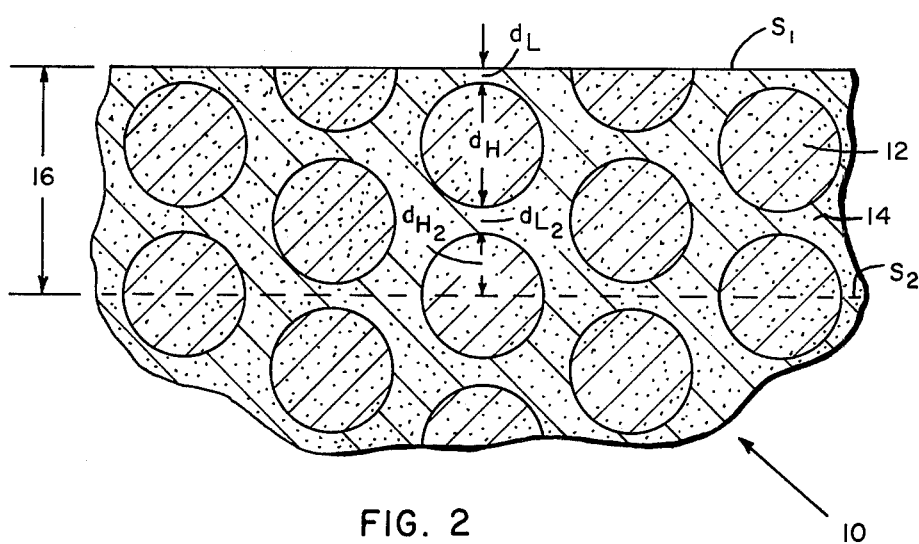
FIG. 2 of the drawing illustrates an enlarged sectional view to illustrate burning surfaces and burning rate of a multimodal blend of ultra-high burning rate propellant granules in a binder or a lower burning rate propellant which serves as the binder.

FIG. 2 depicts like numbers and designations for identities of FIG. 1, but in an enlarged view which additionally depicts a projected burning surface #2 which is illustrated by the designation $S_2$. The burn distance (16) is the distance between $S_1$ and $S_2$ that will be burned. The burning as illustrated in FIG. 2 is explained below in further detail.

The burning rate of the multimodal propellant grain of FIG. 2 can be expressed by the mathematical equation as follows:

$$R \text{ (average burning rate)} = \frac{D \text{ (total distance between surfaces)}}{\frac{d_L}{r_L} + \frac{d_H}{r_H} + \frac{d_{L_2}}{r_{L_2}} + \frac{d_{H_2}}{r_{H_2}} \cdots}$$

The description of the burning as depicted in FIG. 2 is further described as follows:

The surface at $S_1$ is burning. To go from $S_1$ to $S_2$ the burn path goes through $d_L + d_H + d_{L_2} + d_{H_2}$.

The burn times are:

$$\text{Time} = \frac{\text{distance}}{\text{rate}},$$

i.e., $T_L = \frac{d_L}{r_L}$, $T_H = \frac{d_H}{r_H}$, $T_{L_2} = \frac{d_{L_2}}{r_{L_2}}$, $T_{H_2} = \frac{d_{H_2}}{r_{H_2}}$.

The burn time from $S_1$ to $S_2$ is $T_L + T_H + T_{L_2} + T_{H_2} \cdots$

The burn distance from $S_1$ to $S_2$ is $d_L + d_H + d_{L_2} + d_{H_2} \cdots$

Thus, the burn rate from $S_1$ to $S_2$ is:

$$\frac{d_2 + d_H + d_{L_2} + d_{H_2} \cdots}{T_2 T_H + T_{L_2} T_{H_2} \cdots}$$

The surfaces at $S_1$ and $S_2$ may not be fixed planes; however, they may be treated as such, since the total surface area is averaging constant in going from $S_1$ to $S_2$.

The multimodal blend of this propellant is preferably perpared from two independent propellants which have been prior tested for burning rate and mechanical properties. When the multimodal blend is cured to a grain it will burn as a single propellant. The grain is a combination of the desired high burning rate and good physical properties.

The multimodal blend of this propellant need not be limited to only two propellants. The granulation size and the ratio of the ultra-high burning rate granules and the binder propellant will determine the burning rate. A particle size range from about 100 microns (0.1 mm) to about 5 mm can be employed. This particle size range would permit the retention of the propellant formulation ingredient in individual granules. If the grinding were made to particle sizes smaller than the propellant ingredient particle size then the advantage of the discrete particle size of the ultra-high propellant would be lost. The selection of the particle size would depend on the thickness required in the finished propellant grain web. The larger particle size could be used for thicker propellant web whereas the smaller particle size could be used for thick or thin propellant web. Thus, by selecting the particle size and the quantity a good control of burning in the finished grain is achieved. A range in weight percent of the ultra-high propellant granules from about 80 to about 96 with a range from about 4 to about 20 weight percent for the binder propellant is preferred. Processing aids (e.g., lecithin and the like) can be employed in the propellant mixing procedure to assist in achieving uniformity of the multimodal blend.

I claim:

1. The method of preparing a high burning rate solid propellant grain that is comprised of a multimodal blend of at least one ultra-high burning rate propellant that has been cured and ground to a predetermined particle size and at least one uncured propellant composition that has high tensile strength and compatibility with the ultra-high burning rate propellant and that serves as a binder for the solid propellant grain when cured, said method comprising:

(i) preparing an ultra-high burning rate propellant that burns in excess of 15 inches per second, said ultra-high burning rate propellant comprised of aluminum metal fuel, ultrafine ammonium perchlorate oxidizer, a hydroxy-terminated polybutadiene polymer binder, a carborane burning rate modifier, a plasticizer, a crosslinking agent, and a diisocyanate curing agent;

(ii) curing said ultra-high burning rate propellant in thin sheets to facilitate grinding to a predetermined particle size of granules;

(iii) grinding said ultra-high burning rate propellant to a predetermined particle size of granules from about 0.1 mm to about 5 mm;

(iv) preparing an uncured propellant composition that has a high tensile strength when cured but a lower burning rate than said ultra-high burning rate propellant, said uncured propellant composition serving as the binder for said multimodal propellant grain containing said ultra-high burning rate propellant granules;

(v) adding an amount from about 80 to about 96 weight percent of said granules of said ultra-high burning rate propellant to an amount from about 20 to about 4 weight percent of said uncured propellant composition to form a multimodal blend containing said amount of said granules and said amount of said uncured binder propellant; and, (vi) curing said multimodal blend to yield a high burning rate solid propellant grain having a controlled burning rate and controlled physical properties achieved by the cured multimodal blend of said cured granules held in dispersed arrangement by said binder propellant.

2. The high burning rate solid propellant grain prepared by the method of claim 1.

* * * * *